(12) United States Patent
Kim et al.

(10) Patent No.: US 7,248,616 B2
(45) Date of Patent: Jul. 24, 2007

(54) BIDIRECTIONAL TRANSCEIVER AND METHOD FOR DRIVING THE SAME

(75) Inventors: Sung Bock Kim, Daejeon (KR); Eundeok Sim, Daejeon (KR); Ki Soo Kim, Jeonju (KR)

(73) Assignee: Electronics and Telecommunications Research Institute (KR)

( * ) Notice: Subject to any disclaimer, the term of this patent is extended or adjusted under 35 U.S.C. 154(b) by 825 days.

(21) Appl. No.: 10/714,016

(22) Filed: Nov. 14, 2003

(65) Prior Publication Data
US 2004/0105680 A1 Jun. 3, 2004

(30) Foreign Application Priority Data
Dec. 3, 2002 (KR) ............. 10-2002-0076212

(51) Int. Cl.
*H01S 3/08* (2006.01)
(52) U.S. Cl. ............................ 372/96; 372/50.11
(58) Field of Classification Search ............. 372/96, 372/43.01, 20, 50.11
See application file for complete search history.

(56) References Cited
U.S. PATENT DOCUMENTS 4,829,535 A * 5/1989 Utaka .................. 372/50.11
5,325,382 A * 6/1994 Emura et al. .............. 372/26
6,104,739 A * 8/2000 Hong et al. ............. 372/50.11

* cited by examiner

*Primary Examiner*—Minsun Oh Harvey
*Assistant Examiner*—Tuan N. Nguyen
(74) *Attorney, Agent, or Firm*—Blakely Sokoloff Taylor & Zafman

(57) ABSTRACT

There are provided a bi-directional transceiver module and a method for driving the same. The bi-directional transceiver module includes a 1.3 μm Distributed Bragg Reflection Laser Diode (DBR LD) including an active layer which performs light-emission in response to a light at 1.3 μm and a DBR mirror formed near the active layer. The DBR mirror is formed to prevent an upstream signal emerging from the 1.3 μm DBR LD from being deleted by a PD. A monitoring PD and a PD for detecting an optical signal are integrated and mounted behind the DBR mirror using a butt-joint method. The 1.3 μm DBR LD, the monitoring PD, and the PD for detecting the optical signal are electrically isolated by insulated areas. To drive the bi-directional transceiver module, a forward bias (+) is applied to a p-electrode formed on the 1.3 μm DBR LD, a backward bias (−) is applied to p-electrodes formed on the monitoring PD and the PD for detecting the optical signal, and a n-electrode as a common electrode is grounded.

9 Claims, 6 Drawing Sheets

BIDIRECTIONAL TRANSCEIVER AND METHOD FOR DRIVING THE SAME

BACKGROUND OF THE INVENTION

This application claims the priority of Korean Patent Application No. 2002-76212, filed on Dec. 3, 2002, in the Korean Intellectual Property Office, the disclosure of which is incorporated herein in its entirety by reference.

1. Field of the Invention

The present invention relates to a transceiver for an Asynchronous Transfer Mode Passive Optical Network (ATM-PON), and more particularly, to a transceiver for an Optical Network Unit (ONU), the transceiver including a Laser Diode (LD) as a transmitting device at 1.3 μm and a Photo Diode (PD) as a light receiving device at a 1.55 μm, the LD and the PD being integrated into one chip.

2. Description of the Related Art

In an Asynchronous Transfer Mode Passive Optical Network (ATM-PON) recommended in ITU-T G.983.1, bi-directional communications are carried out for transmitting an upstream signal at 1.3 μm and a downstream signal with a wavelength of 1.55 μm. A conventional transceiver module for bi-directional optical communication includes a transmitting module and a receiving module which respectively transmit and receive a signal through separate optical fiber lines. Recently, a transceiver module in which the transmitting module and the receiving module have been integrated into one package has been developed. However, this transceiver module also transmits and receives a signal through separate optical fiber lines. To reduce the number of optical components and the installation costs thereof, and to thereby implement an economical optical communication network, a transceiver module performing bi-directional communication through a single optical fiber line and a method therefor have been developed. Such a conventional transceiver module comprises a Y-shaped light division waveguide, a Wavelength Division Multiplexing (WDM) filter, a semiconductior laser as a light-emitting device, and an optical detector as a light-receiving device, all these components being integrated in a hybrid manner.

FIG. 1 shows an example of a conventional transceiver module for an ONU, wherein optical devices are integrated in a hybrid manner.

Referring to FIG. 1, an optical signal at a 1.55 μm input through a line of an optical fiber is divided by a Y-shaped light division waveguide 10 and transferred to an optical detector 14 consisting of a PD via a WDM filter 12. Then, the optical detector 14 detects the optical signal. Also, an optical signal at 1.3 μm, output from a LD 22 as a light source, is coupled with the Y-shaped light division waveguide 10, passed through a Y-shaped light division point, and input to the optical fiber 30 via a common waveguide. The WDM filter 12 is mounted to prevent the optical signal at 1.3 μm from being reflected and input to the optical detector 14. In FIG. 1, a reference number "24" represents a monitoring PD.

To fabricate the transceiver module shown in FIG. 1, a light-emitting device, a light-receiving device, a WDM filter, a Y-shaped light division waveguide, etc. are packaged together using a precision optical arrangement method. However, such a fabrication method has a disadvantage, in that insertion loss is large and the outputs of transmitted lights and receiving sensitivities of the received lights are low, since optical couplings using the precision optical arrangement method are required many times between the Y-shaped light division waveguide and the respective optical devices. Furthermore, since the optical devices of the transceiver module are separately fabricated and optically coupled to each other using a precision optical arrangement packaging process, a packaging cost is high, and accordingly, low cost type module cannot be fabricated. In addition, minimization of the transceiver module is difficult.

To overcome these disadvantages, a method to integrate a semiconductor laser, an optical detector, a light division waveguide, etc., on one substrate, in a semiconductor process, has been developed. An integrated device fabricated using this method has an excellent performance, compared to the case where independent devices are used. Also, because the method requires only an arrangement of optical fibers, without other frequent optical arrangements, the packaging process is simplified. However, this method also results in large insertion loss, and the transceiver module is difficult to minimize and integrate into one chip. In addition, the method requires a complicated fabrication process, thereby not allowing a high yield.

FIG. 2 shows another example of a conventional bi-directional transceiver module.

Referring to FIG. 2, a bi-directional optical device 110 is flip-chip bonded on a manual arrangement type substrate 141 such that a light-receiving device 110a faces downward. An optical fiber 120 is arranged and fixed in a V-groove so that an end of the optical fiber 120 is polished inclinedly and an acute portion of the end faces the light-receiving device 110a. The space between the optical device 110 and the optical fiber 120 is filled with a refraction index controlling medium 125 such as silicon gel. A reflection device 133 is mounted behind the monitoring PD 136 of the optical device 110.

In the construction of FIG. 2, a laser as a light source, a monitoring PD, and a light signal detection PD are integrated in a vertical direction. This construction is designed so that a light output from the laser is input to the optical fiber core, while a signal light output from the optical fiber is input to the light receiving device for detecting the signal. This is achieved by polishing the end of the optical fiber into an appropriate angle (35°) according to the Snell's law for an optical fiber to be optically arranged in the integrated optical communication module. According to this method, since the laser and the light-receiving device are integrated in a vertical direction using a semiconductor growth technique, the optical module can be easily fabricated and the precision optical arrangement using the Y-shaped light division waveguide and various optical devices is unnecessary. However, since this method must use a special optical fiber polished to a desired angle and an optical arrangement between an optical fiber and a module is difficult, a packaging cost is high. Also, in a case where a signal light output from the laser is reflected by the optical fiber and input to the light-receiving device, a transmitting light and a receiving light are mixed, and thus, received information can be incorrectly interpreted. Therefore, an output of the transmitting light reflected by the optical fiber must be lower than the receiving sensitivity (−40 dBm) of the light-receiving device. This requires very complicated optical arrangements and precision treatments of the optical fibers, thereby increasing the packaging cost and resulting in a low yield.

FIG. 3 shows a bi-directional transceiver module 200 published in the OFC/IOOC 1999 Technical Digest by Alcatel, as still another example of a conventional bi-directional transceiver module.

The bi-directional transceiver module 200 shown in FIG. 3 includes three parts, i.e., a DFB laser 210 at a 1.3 μm, an absorber 220 at 1.3 μm, and a light-receiving device 230 at 1.55 μm. Referring to FIG. 3, a receiving light signal of 1.55 μm as a downstream signal is not absorbed by the 1.3 μm DFB laser 210 and the 1.3 μm absorber 220 and is detected by the light receiving device 230. A transmitting signal from the 1.3 μm DFB laser 210 is transmitted in a upward direction through the optical fiber, and an optical signal output from the rear-end of the 1.3 μm DFB laser 210 is absorbed by the 1.3 μm absorber 220. However, the absorber 220 at the center portion must completely absorb the transmitting signal from the 1.3 μm DFB laser 210 so that the output power of the transmitting signal is lower than the receiving sensitivity (−40 dBm) of the light-receiving device 230 as an optical detector, in order to divide the optical transmitting signal from the optical receiving signal and correctly transfer received information. However, it is very difficult for the absorber 220 to completely absorb a transmitting light with a very high output. Accordingly, the structure described above is very difficult to be implemented in spite of its simple arrangement.

As described above, to reduce installation costs of optical fibers and the number of optical components needed for optical communication, research on a bi-directional transceiver module that transmits and receives a signal on one line of optical fiber have been carried out. However, a proposed technique for integrating various optical components in a hybrid manner increases the size of the resultant transceiver module, increases insertion loss, requires a precision optical arrangement, has low economy, and results in a low yield. Also, single integration techniques proposed heretofore are still problematic in view of dividing an optical transmitting signal from an optical receiving signal and correctly obtaining received information.

SUMMARY OF THE INVENTION

The present invention provides a bi-directional transceiver for transmitting and receiving a signal through a line of optical fiber, by integrating a semiconductor laser for light transmission and an optical detector as a light receiving device into one chip, thereby increasing coupling efficiency of optical devices with the optical fiber, reducing a packaging cost, decreasing the number of optical devices needed, and reducing a total fabrication cost.

The present invention also provides a method for driving the bi-directional transceiver.

According to an aspect of the present invention, there is provided a bi-directional transceiver module which respectively transmits and receives a transmitting optical signal and a receiving optical signal through a line of optical fiber, the transceiver module comprising: a 1.3 μm Distributed Bragg Reflection Laser Diode (DBR LD), which includes an active layer which performs light-emission in response to a light at 1.3 μm and a DBR mirror formed near the active layer; a monitoring Photo-Diode (PD), which has a predetermined energy band gap to absorb a light with a wavelength of 1.3 μm and transmits a light with a wavelength of 1.55 μm; an optical signal detection PD, which has a predetermined energy band gap to absorb a signal with a wavelength of 1.55 μm; an insulated area, which electrically isolates the 1.3 μm DBR LD, the monitoring PD, and the optical signal detection PD, respectively; a p-electrode, which is formed in the 1.3 μm DBR LD, the monitoring PD, and the optical signal detection PD, respectively; and a n-electrode, which is a common electrode.

The DBR mirror has a reflection ratio of 95 through 99%. The bi-directional transceiver further comprises an InGaAsP semiconductor layer at near 1.3 μm DBR LD, to completely absorb a signal at 1.3 μm from the DBR mirror. The InGaAaP semiconductor layer has an energy band gap of 0.85 through 0.9 eV. The InGaAsP semiconductor layer is formed near the active layer through a regrowth using a butt-joint method.

Also, the bi-directional transceiver further comprises an InGaAs optical detection layer formed near the monitoring PD, to absorb a downstream optical signal at 1.55 μm. The isolated area is formed using a chemical etching method or an ion implantation method.

According to another aspect of the present invention, there is provided a method for operating a bi-directional transceiver module according to claim 1, in order to transmit a transmitting optical signal and a receiving optical signal simultaneously through a piece of optical fiber, the method comprising: applying a forward bias (+) to the p-electrode formed on the 1.3 μm DBR LD; applying a backward bias (−) to the p-electrode formed on the monitoring PD and the optical signal detection PD; and grounding the n-electrode.

Therefore, according to the present invention, it is possible to provide excellent communication performance, to decrease insertion loss without light division, to reduce the number of optical devices needed, to achieve simple optical arrangement, and to thereby reduce a total fabrication cost of the transceiver module. Also, the present invention can use a general optical fiber without using a special optical fiber, and also improve the crosstalk between a transmitting signal and a receiving signal, by integrating a transmitting device and a receiving device in a horizontal direction and blocking a transmitting signal using a DBR mirror.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described in detail with reference to the appended drawings.

Figure 1:
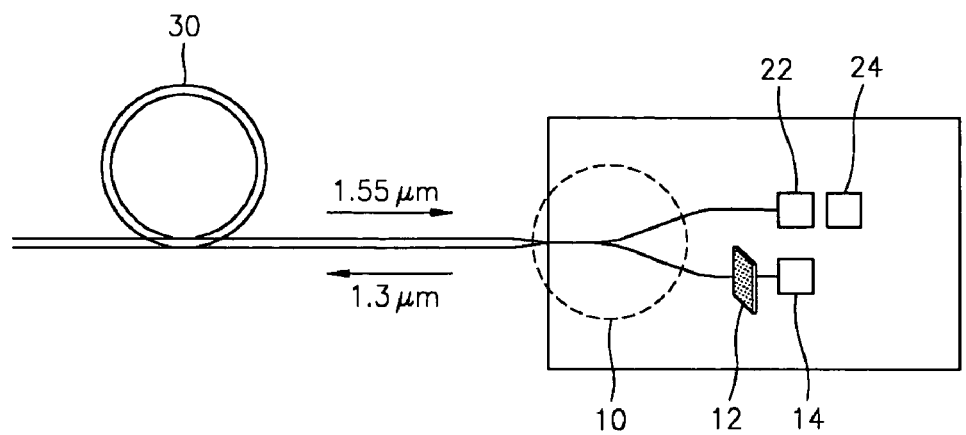
FIG. 1 shows an example of a conventional transceiver module for an ONU.
Figure 2:
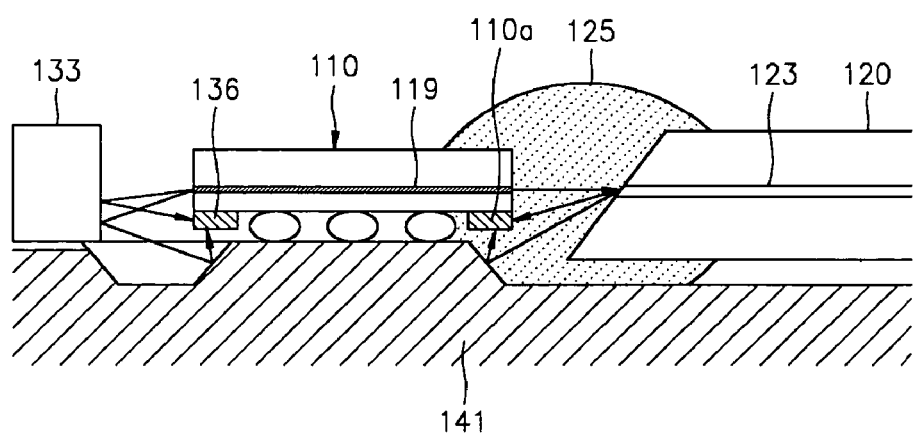
FIG. 2 shows another example of a conventional bi-directional transceiver module.
Figure 3:
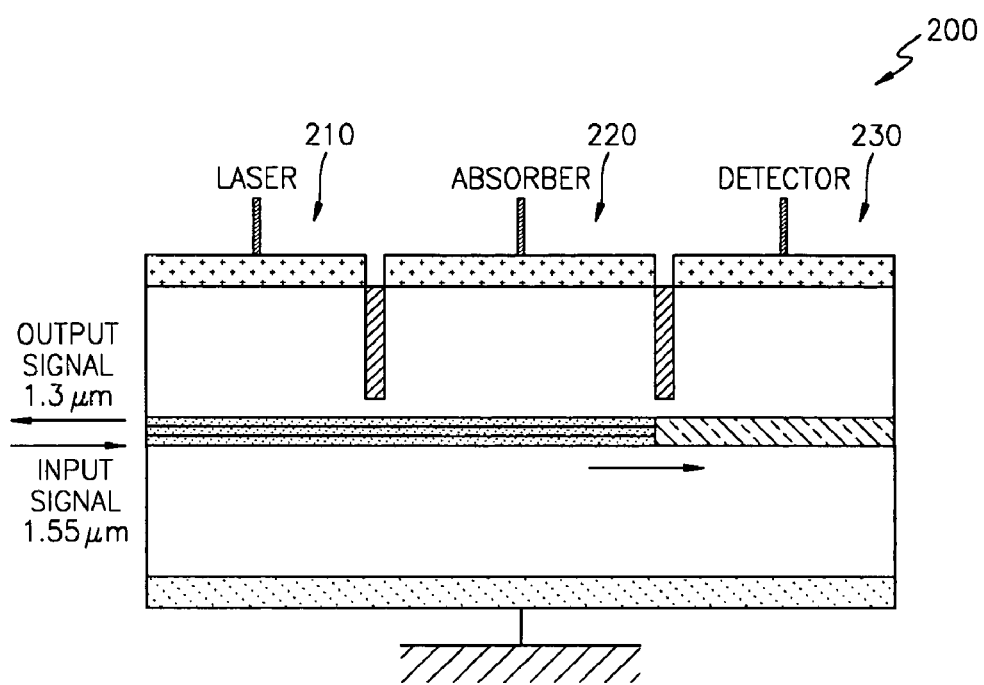
FIG. 3 shows still another example of a conventional bi-directional transceiver module.
Figure 4:
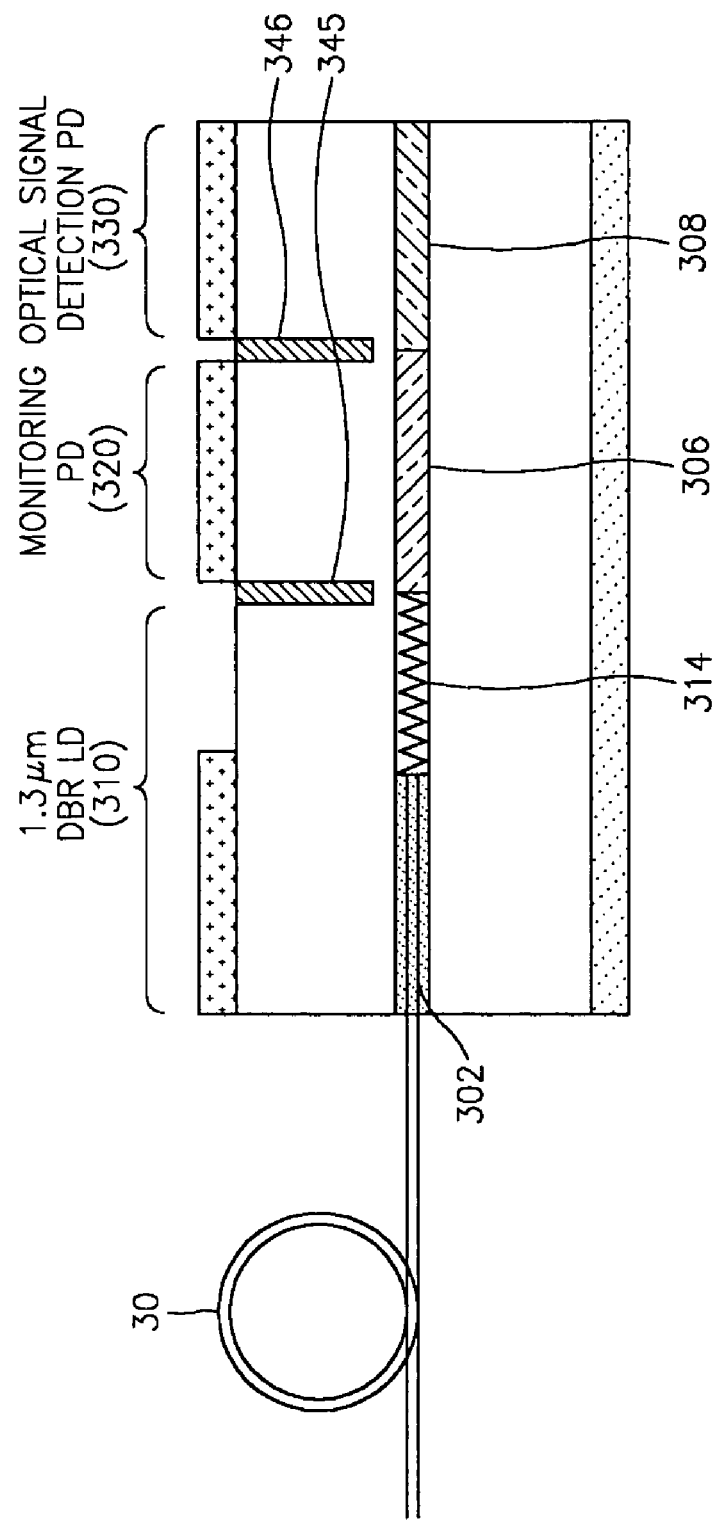
FIG. 4 shows a bi-directional transceiver module, according to a preferable embodiment of the present invention.

FIG. 4 shows an Optical Network Unit (ONU) transceiver module for bi-directional optical communication, according to a preferable embodiment of the present invention.

Referring to FIG. 4, the ONU transceiver module for bi-directional optical communication includes a 1.3 μm Distributed Bragg Reflection Laser Diode (DBR LD) 310, a monitoring Photo-Diode (PD) 320, and an optical signal detection PD 330, which have a sequential energy band gap respectively, are respectively electrically isolated using a chemical wet-etching method or an ion-implantation method, and respectively have a light-emitting function, an optical output detection function, and an optical signal detection function.

The bi-directional transceiver module includes a multiple quantum well of active layer 302 capable of creating an optical signal at 1.3 μm, and a 1.3 μm DBR mirror 314 formed near the active layer 302. The 1.3 μm DBR mirror 314 prevents the optical signal from being absorbed by a following light-receiving area. The monitoring PD 320 is located next to the 1.3 μm DBR mirror 314. The monitoring PD 320 has a predetermined energy band gap so as to absorb light at 1.3 μm and not to absorb a light with a wavelength of 1.55 μm. The optical signal detection PD 330 is located next to the monitoring PD 320. The optical signal detection PD 330 is an optical detector as a light-receiving device for absorbing a downstream receiving signal of 1.55 μm.

Also, insulated areas 345 and 346 are formed between the 1.3 μm DBR LD 310 and the monitoring PD 320 and between the monitoring PD 320 and the optical signal detection PD 330, to electrically isolate the 1.3 μm DBR LD 310, the monitoring PD 320, and the optical signal detection PD 330, respectively. The insulated areas 345 and 346 are formed using a chemical etching method or an ion implantation method. A forward bias (+) is applied to the 1.3 μm DBR LD 310 and a backward bias (−) is applied to the monitoring PD 320 and the optical signal detection PD 330.

In FIG. 4, a reference number "306" represents an absorber of the monitoring PD 320, and a reference number "308" represents an InGaAs optical detection layer of the optical signal detection PD 330.

FIGS. 5A through 5E are sectional views of the bi-directional transceiver module, according to sequences of a fabricating process, for explaining a method for fabricating the bi-directional transceiver module, according to a preferable embodiment of the present invention.

Figure 5A:
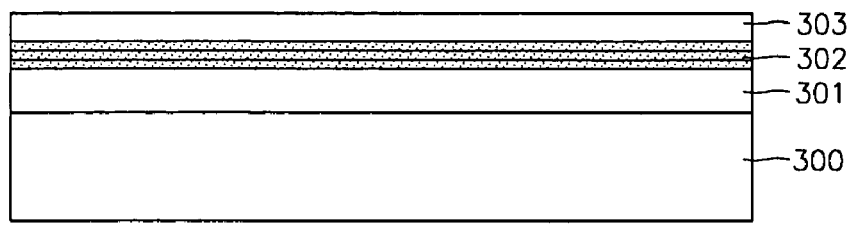
FIGS. 5A through 5E are sectional views of the bi-directional transceiver module, according to sequences of a fabricating process, for explaining a method for fabricating the bi-directional transceiver module, according to a preferable embodiment of the present invention.

Referring to FIG. 5A, a n-type clad layer 301 is grown on a n-type InP substrate 300, and an active layer 302 with a center wavelength of 1.3 μm is grown to a multiple quantum well. Then, a p-type clad layer 303 is grown on the active layer 302 using a semiconductor growth technique. The active layer 302 with a center wavelength of 1.3 μm creates an upstream optical signal and transmits a downstream optical signal with a wavelength of 1.55 μm without loss.

Figure 5B:
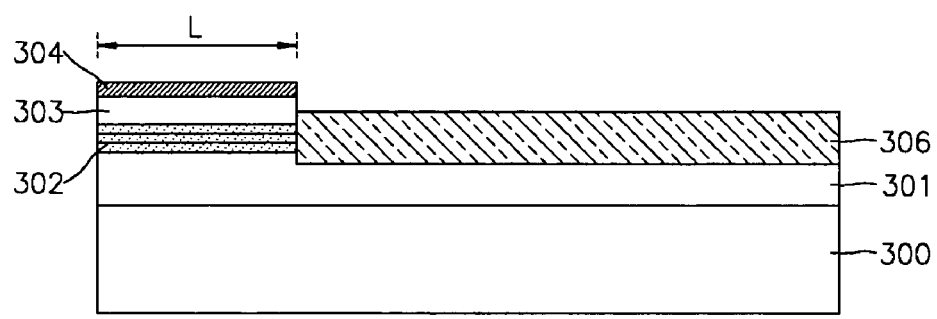

Referring to FIG. 5B, the active layer 302 is patterned using a dielectric mask 304, and an active layer 302 with a desired length L, for example, with a length of 300 μm is created, in order to obtain a sufficient optical gain of the light with the wavelength of 1.3 μm . Then, a semiconductor layer 306 with an energy band gap of 0.85 through 0.9 eV is grown through a wet-etching method and a regrowth using a butt-joint method. The semiconductor layer 306 consists of an InGaAsP layer. The semiconductor layer 306 is used for the DBR mirror 314 and the absorber of the monitoring PD 320 shown in FIG. 4. The InGaAsP layer with the energy band gap of 0.85 through 0.9 eV absorbs an upstream optical signal at 1.3 μm while transmitting a downstream optical signal without loss. Accordingly, there is achieved a structure allowing an optical signal to be transferred to the optical signal detection PD 330 at a final location without any loss.

Figure 5C:
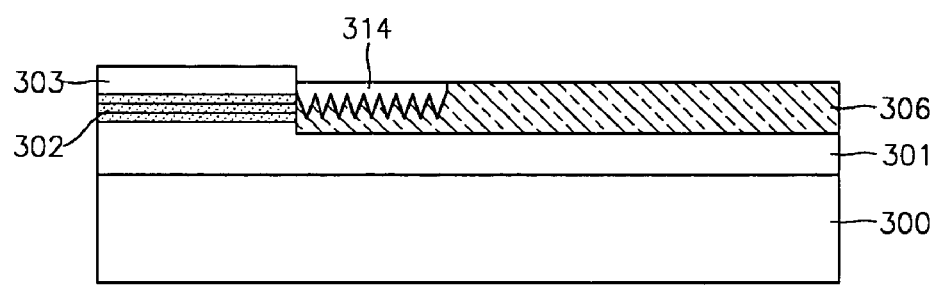
Figure 5D:
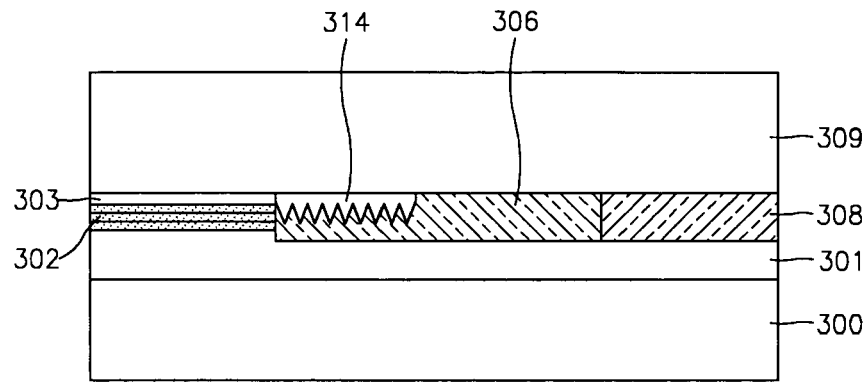

Referring to FIG. 5C, a grating with a length of 1.3 μm is carved rear the active layer 302 to form a DBR mirror 314. The DBR mirror 314 is coupled with the active layer 302 to construct a 1.3 μm DBR LD 310. The 1.3 μm DBR LD 310 acts as a transmission optical source. Accordingly, a resonance mirror, a side of which is a cleavage edge and other side of which is the DBR mirror 314, is formed. The DBR mirror 314 is designed to have a reflection ratio of 95 through 99%. This construction allows it to properly decrease the strength of the light emerging from the DBR mirror 314. The light is completely absorbed by the absorber of the monitoring PD 320 consisting of the semiconductor layer 306 at the next location, which allows an optical output of a laser to be detected and simultaneously prevents the light from being transferred to the optical signal detection PD 330 at the final location.

The length of the monitoring PD 320 should be designed in consideration of two aspects. First, the length of the monitoring PD 320 should be designed to completely absorb light with the wavelength of 1.3 μm reflected by the DBR mirror 314. Accordingly, it is preferable that the length of the monitoring PD 320 be longer. Also, the length of the monitoring PD 330 should be designed to minimize the absorption of the optical signal with the wavelength of 1.55 μm by an exponential Urbach tail of the monitoring PD 330 absorber. Accordingly, it is preferable that the length of the monitoring PD 320 be shorter. Therefore, an optimal condition, dependent on the reflection ratio of the DBR mirror 314 and the energy band gap of the absorber of the monitoring PD 320, should be searched for such that the two above aspect are satisfied, Referring to FIG. 5D, after the structure in which the DBR mirror 314 is formed is subjected to a predetermined optical lithography process, the InGaAs optical detection layer 308 is regrown using a butt-joint method, in order to form the optical signal detection PD 330 for detecting the optical signal with the wavelength of 1.55 μm. Thereafter, a p-type clad layer 309 is grown thereon. The InGaAs optical detection layer 308 is an area for absorbing and detecting the optical signal with the wavelength of 1.55 μm. For sufficient light absorption, the length of the InGaAs optical detection layer 308 is designed to be preferably above 100 μm. Because the InGaAs optical detection layer 308 absorbs both wavelengths of 1.3 μm and 1.55 μm, it is necessary to prevent the light with the wavelength of 1.3 μm from being input to the InGaAs optical layer 308 by optimally designing the DBR mirror 314 and the absorber 306 of the monitoring PD 320. If the light with the wavelength of 1.3 μm is not prevented from being input to the InGaAs optical layer 308, the bi-directional transceiver module incorrectly operates due to noise generated by mixing the light signal with the wavelength of 1.3 μm with the light signal with the wavelength of 1.55 μm.

Figure 5E:
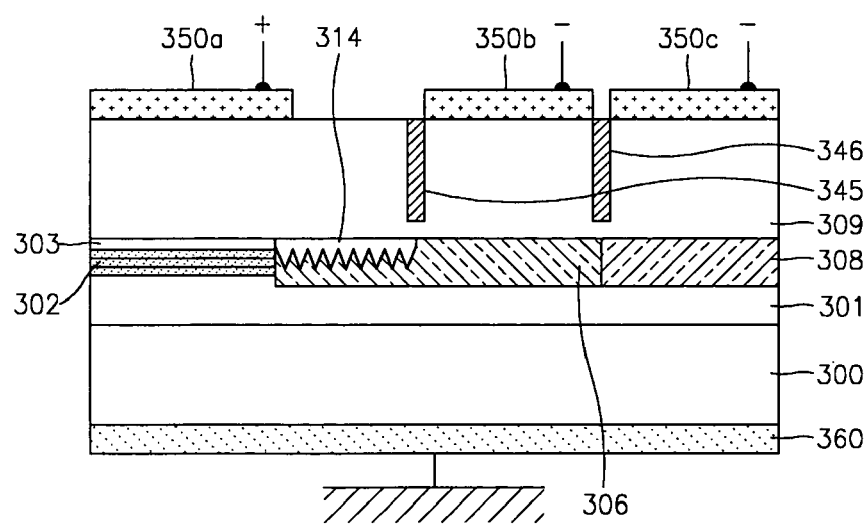

Referring to FIG. 5E, to allow the 1.3 μm DBR LD 310, the monitoring PD 320, and the optical signal detection PD 330 to perform independent functions, respectively, three areas constituting the 1.3 μm DBR LD 310, the monitoring PD 320, and the optical signal detection PD 330 are electrically isolated. For achieving this isolation, insulated areas 345 and 346 are formed between the 1.3 μm DBR LD 310 and the monitoring PD 320 and between the monitoring PD 320 and the optical signal detection PD 330. For forming the insulated areas 345 and 346, channels are formed in a vertical direction upper the active layer 302 using a chemical etching method or an ion implantation method.

Then, p-electrodes 350a, 350b, and 350c and a common n-electrode 360 are formed respectively independently on the resultant structure.

To operate an optical device formed using the method described above, a forward bias is applied to the 1.3 μm DBR LD 310 and a backward bias is applied to the respective PDs. More specifically, the common n-electrode 360 is grounded, an anode is connected to the p-electrode 350*a* of the laser part, and a cathode is connected to the p-electrodes 350*a* and 350*c* of the optical signal detection PD 330 part.

Figure 6:
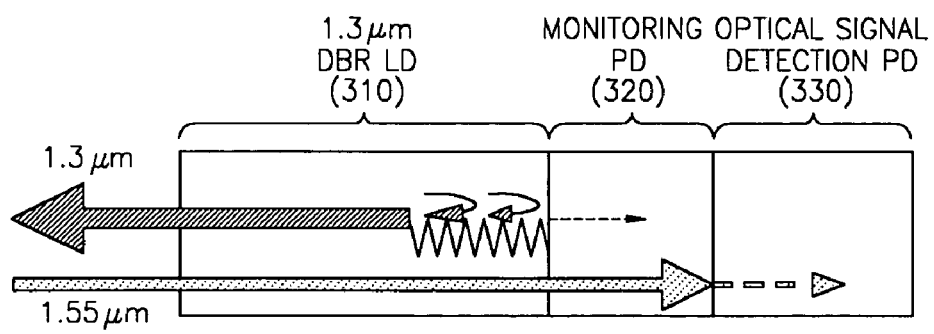
FIG. 6 is a view for explaining how upstream and downstream signals are absorbed by respective areas in the bi-directional transceiver module, wherein the upstream and downstream signals are used for bi-directional communication, according to a preferable embodiment of the present invention.

FIG. 6 is a view for explaining how the upstream and downstream signals are absorbed by the respective areas in the bi-directional transceiver module, according to a preferable embodiment of the present invention, wherein the upstream and downstream signals are used for bi-directional communication. FIG. 6 schematically shows how the downstream optical signal with the wavelength of 1.55 μm and the upstream optical signal with the wavelength of 1.3 μm are generated, absorbed, and permeated by the transceiver module.

Referring to FIG. 6, the downstream optical signal with the wavelength of 1.55 μm is not absorbed by the 1.3 μm DBR LD 310 and the monitoring PD 320 but the optical signal detection PD 330, and is subjected to photocurrent and signal processing.

Meanwhile, the upstream optical signal with the wavelength of 1.3 μm generated by the transceiver module is reflected in a proportion of about 95 through 99% by the DBR mirror 314 and is then input to the optical fiber side. The optical output of about 1 through 5% is absorbed by the monitoring PD 320 to monitor the output of the 1.3 μm DBR LD 310. Therefore, the light with the wavelength of 1.3 μm is not absorbed by the optical signal detection PD 330, and accordingly the transmitting signal is not mixed with the receiving signal.

The transceiver module according to the present invention performs bi-directional communication that simultaneously transmits and receives an optical signal through a line of optical fiber, by integrating a semiconductor LD for optical transmission, an optical signal detection PD, and a monitoring PD for monitoring an optical output of the LD, in a horizontal direction, on one semiconductor substrate. Particularly, when the transceiver module is integrated during fabrication, a DBR mirror and an absorption area used as the monitoring PD are formed behind a light-emitting area, so to optically isolate the light-emitting area from a light-receiving area. Therefore, an optical transmitting signal emerging from a laser is not absorbed by the receiving area and accordingly received information can be correctly obtained. Also, the monitoring PD is integrated with the optical signal detection PD using a butt-joint method. The method for fabricating the transceiver module according to the present invention, as described above, can substitute the conventional method in which several optical devices are coupled and assembled with various optical components. According to the present invention, a fabricating cost of transceiver module can be significantly reduced.

Compared to a conventional technique in which respective optical devices are manufactured respectively and packaged in a hybrid manner on one substrate, the present invention has excellent performance, has less insertion loss without light division, requires less optical devices, has a simple light arrangement, and a reduced fabrication cost. Also, compared to the integrated-type transceiver module according to the conventional technique, the present invention has a simpler arrangement, is capable of using a general optical fiber without a specific optical fiber, and improves the crosstalk between a transmitting light and a receiving light, thereby providing excellent performance.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A bi-directional transceiver module which respectively transmits and receives a transmitting optical signal and a receiving optical signal through a line of optical fiber, the transceiver module comprising:
   a 1.3 μm Distributed Bragg Reflection Laser Diode (DBR LD), which includes an active layer which performs light-emission in response to a light at 1.3 μm and a DBR mirror formed near the active layer;
   a monitoring Photo-Diode (PD), which has a predetermined energy band gap to absorb a light with a wavelength of 1.3 μm and transmits a light with a wavelength of 1.55 μm;
   an optical signal detection PD, which has a predetermined energy band gap to absorb a signal with a wavelength of 1.55 μm;
   an insulated area, which electrically isolates the 1.3 μm DBR LD, the monitoring PD, and the optical signal detection PD, respectively;
   a p-electrode, which is formed in the 1.3 μm DBR LD, the monitoring PD, and the optical signal detection PD, respectively; and
   a n-electrode, which is a common electrode.

2. The bi-directional transceiver module of claim 1, wherein the DBR mirror has a reflection rate of 95 through 99%.

3. The bi-directional transceiver module of claim 1, further comprising an InGaAsP semiconductor layer formed near the 1.3 μm DBR LD, to completely absorb a signal with a wavelength of 1.3 μm reflected from the DBR mirror.

4. The bi-directional transceiver module of claim 3, wherein the InGaAaP semiconductor layer has an energy band gap of 0.85 through 0.9 eV.

5. The bi-directional transceiver module of claim 3, wherein the InGaAsP semiconductor layer is formed near the active layer by a regrowth using a butt-joint method.

6. The bi-directional transceiver module of claim 3, further comprising an InGaAs optical detection layer formed near the monitoring PD, to absorb a downstream optical signal with a wavelength of 1.55 μm.

7. The bi-directional transceiver module of claim 1, further comprising an InGaAs optical detection layer formed near the monitoring PD, to absorb a downstream optical signal with a wavelength of 1.55 μm.

8. The bi-directional transceiver module of claim 1, wherein the insulated area is formed using a chemical etching method or an ion implantation method.

9. A method for operating a bi-directional transceiver module, in order to transmit a transmitting optical signal and a receiving optical signal simultaneously through a piece of optical fiber, said module including:
   a 1.3 μm Distributed Bragg Reflection Laser Diode (DBR LD), which includes an active layer which performs light-emission in response to a light at 1.3 μm and a DBR mirror formed near the active layer;
   a monitoring Photo-Diode (PD), which has a predetermined energy band gap to absorb a light with a wavelength of 1.3 μm and transmits a light with a wavelength of 1.55 μm;
   an optical signal detection PD, which has a predetermined energy band gap to absorb a signal with a wavelength of 1.55 μm;

an insulated area, which electrically isolates the 1.3 μm DBR LD; the monitoring PD; and the optical signal detection PD, respectively;

a p-electrode, which is formed in the 1.3 μm DBR LD, the monitoring PD, and the optical signal detection PD, respectively; and a n-electrode, which is a common electrode;

the method comprising:

applying a forward bias (+) to the p-electrode formed on the 1.3 μm DBR LD;

applying a backward bias (−) to the p-electrode formed on the monitoring PD and the optical signal detection PD; and grounding the n-electrode.

* * * * *